UNITED STATES PATENT OFFICE.

CHARLES H. WATERS, OF GROTON, ASSIGNOR TO THE CLINTON WIRE-CLOTH COMPANY, OF CLINTON, MASSACHUSETTS.

IMPROVEMENT IN PAINTING WIRE-CLOTH.

Specification forming part of Letters Patent No. 84,520, dated December 1, 1868; reissue No. 4,463, dated July 4, 1871; reissue No. 6,626, dated August 31, 1875; application filed January 7, 1875.

*To all whom it may concern:*

Be it known that I, CHARLES H. WATERS, of Groton, in the county of Middlesex and State of Massachusetts, have invented or discovered a new and useful Improvement in Painting Wire-Cloth, of which the following is a specification:

Heretofore the painting of wire-cloth has been done by hand, and the process has necessarily been slow and expensive. I have invented an improvement in the art of painting wire-cloth, by which it is accomplished better than by hand, and much more rapidly and economically.

My improvement consists in immersing the wire-cloth in a bath or mass of the desired paint, and, while it is thus thoroughly coated, subjecting the surfaces of the wire-cloth to pressure, for pressing or squeezing off the surplus paint. By this means a smooth surface is given to the painted wire without waste of paint.

An apparatus suitable for carrying out my improvements in the art of painting wire-cloth is described in another division of the application for reissue of the original Letters Patent, numbered 84,520, filed simultaneously herewith; but I wish it to be understood that I do not confine myself to the use of any particular apparatus for the purpose, as my improvement may be practiced by the use of various apparatus of different constructions, performing the operations in which I have above stated my improvement to consist; and the object and essential operation of dipping the wire-cloth in the bath of paint being simply to thoroughly coat all parts of the surface with the paint, it will be obvious that the process includes not only such an operation as would be technically described as dipping, but includes, generally, passing the cloth through a quantity of paint sufficient or more than sufficient to coat all parts of the surface with it in such way that it shall be so coated.

I claim—

As an improvement in the art of painting wire-cloth, immersing it in a bath or mass of paint, so as to fully cover all parts of its surfaces with the paint, and then subjecting the surfaces of the cloth to pressure to squeeze or press off the surplus paint, substantially as described.

CHARLES H. WATERS.

Witnesses:

N. AUSTIN PARKS,

R. L. ROBERTS.